US008572960B2

(12) United States Patent
Laubender

(10) Patent No.: US 8,572,960 B2
(45) Date of Patent: Nov. 5, 2013

(54) METHOD FOR OPERATING A COMPRESSOR

(75) Inventor: Jochen Laubender, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 921 days.

(21) Appl. No.: 12/327,022

(22) Filed: Dec. 3, 2008

(65) Prior Publication Data

US 2009/0151349 A1 Jun. 18, 2009

(30) Foreign Application Priority Data

Dec. 14, 2007 (DE) ............................ 102007060218

(51) Int. Cl.
*F02B 39/16* (2006.01)

(52) U.S. Cl.
USPC ................................ 60/600; 60/597; 123/564

(58) Field of Classification Search
USPC ..................... 60/600, 611, 597, 598; 123/564
See application file for complete search history.

(56) References Cited

U.S. PATENT DOCUMENTS

| | | | | | |
|---|---|---|---|---|---|
| 3,190,068 | A | * | 6/1965 | Williams et al. | 60/607 |
| 4,817,387 | A | * | 4/1989 | Lashbrook | 60/611 |
| 5,680,763 | A | * | 10/1997 | Unland et al. | 60/602 |
| 5,724,813 | A | * | 3/1998 | Fenelon et al. | 60/606 |
| 5,950,432 | A | * | 9/1999 | Zimmer et al. | 60/605.1 |
| 6,845,616 | B2 | * | 1/2005 | Jauss | 60/601 |
| 6,918,250 | B2 | * | 7/2005 | Baeuerle | 60/602 |
| 7,010,914 | B1 | * | 3/2006 | Roberts et al. | 60/600 |
| 7,100,584 | B1 | * | 9/2006 | Bruestle et al. | 123/563 |
| 7,254,948 | B2 | * | 8/2007 | Gustafson et al. | 60/611 |
| 7,287,377 | B2 | * | 10/2007 | Wild et al. | 60/602 |
| 8,001,778 | B2 | * | 8/2011 | Sun | 60/605.2 |

FOREIGN PATENT DOCUMENTS

| | | |
|---|---|---|
| DE | 10 2005 010 792 | 9/2006 |
| JP | 3-70819 | 3/1991 |

* cited by examiner

*Primary Examiner* — Burton Mullins
(74) *Attorney, Agent, or Firm* — Kenyon & Kenyon LLP

(57) ABSTRACT

A method for operating a compressor, which supplies an internal combustion engine that is assigned to the compressor at its output end with air compressed to a boost pressure, in which the boost pressure is reducible by releasing the compressed air at least partially via a pressure release valve. The air released via the pressure release valve is used for driving a compressor wheel of the compressor.

14 Claims, 2 Drawing Sheets

METHOD FOR OPERATING A COMPRESSOR

FIELD OF THE INVENTION

The present invention relates to the operation of a compressor which supplies an internal combustion engine assigned to the compressor at its output end, with air compressed to a boost pressure, in which the boost pressure is reducible by releasing the compressed air at least partially via a pressure release valve.

The invention also relates to a compressor, particularly for an internal combustion engine.

BACKGROUND INFORMATION

An operating method of the type mentioned at the outset and a corresponding compressor are known from German Patent Application No. DE 10 2005 010 792. In that document, a pressure release valve configured as a pop-off valve is used in order to rapidly reduce the boost pressure produced by the compressor, by diverting the compressed air to a low-pressure side at the input to the compressor. A cyclic flow is generated thereby, among other things, through a bypass that includes the pop-off valve, which connects the high-pressure side of the compressor to its low-pressure side.

The usual method described using the pop-off valve makes possible a rapid reduction in the boost pressure. However, the problem with pressure equalization across the pop-off valve is that, in the case of a rapid load change of the internal combustion engine, for instance, from full load, at which a throttling device of the internal combustion engine is open all the way, to overrun, at which the throttling device is substantially closed, and subsequently renewed full load operation, the boost pressure on the output side of the compressor, that is, upstream of the throttling device, has to be generated anew. This brings about a delayed response of the internal combustion engine with respect to torque that is output as referred to the torque command of the driver.

Therefore, other usual design approaches provide that, alternatively or in addition to the pop-off valve in the bypass, one should position a second throttling device upstream of the compressor. At least in some operating states, these measures could prevent the undesired transfer of the compressor into a pumping state or even the complete dropping off of the boost pressure at rapid load change, but they require a comparatively large constructive expenditure in the form of an additional actuating mechanism and a correspondingly complex controller.

SUMMARY OF THE INVENTION

It is accordingly an object of the present invention to improve an operating method and a compressor, of the type mentioned at the outset, to the extent that the response of the compressor, and with that also of the supplied internal combustion engine, is improved, particularly during a load change, without requiring an increased complexity in the design and the controller of the compressor at the same time.

This object is attained, according to the present invention, by driving a compressor wheel of the compressor using the air discharged via a pressure release valve. It is advantageously achieved thereby that the energy of the released compressed air does not remain essentially un-utilized, as is the case with bypass systems having a pop-off valve, in which the released air is conveyed non-directionally into an intake manifold upstream of the compressor. Rather, according to the present invention, the energy contained in the released compressed air is advantageously used for maintaining the speed of the compressor wheel and of the running gear that is possibly connected to it, or at least for preventing an excessive dropoff in the speed. One particular advantage of the principle according to the present invention is that, after a positive load change, a very rapid buildup of the boost pressure is possible because the compressor wheel at no time assumes a speed that is substantially below its nominal speed.

The design approach according to the present invention is also distinguished by a particularly low construction expenditure and by a correspondingly simple controller, because the air released by the pressure release valve, according to one variant of the present invention, by contrast to usual systems, is conveyed in a special manner onto the compressor wheel, and that is a directed manner, in order to implement the principle according to the present invention. In particular, no additional actuators are required.

When there is a positive load change, the fast response of the compressor and the internal combustion engine is able to be ensured by the pressure release valve being closed rapidly when necessary. A buildup of the boost pressure, that sets in in this context, takes place particularly rapidly, based on the compressor wheel maintaining a high speed, according to the present invention.

In one advantageous specific embodiment of the operating method according to the present invention, the released air is able to be conveyed directly onto the compressor wheel of the compressor, for example, so as to drive it. It is also possible, according to the present invention, to convey the released air tangentially onto possibly provided guide blades of the compressor, in order to drive the compressor wheel according to the present invention.

In another very advantageous specific embodiment of the operating method according to the present invention, in which the compressor has assigned to it a turbine that is in rotary connection with the compressor wheel so as to drive the compressor wheel, the released air may advantageously even be directly conveyed onto the turbine. This variant of the invention is used, for instance, in compressors which are integrated into exhaust gas turbochargers and are mounted on a common shaft with the turbine.

A further increase in efficiency of the operating method, according to the present invention, is given advantageously if the compressor is throttled on the input side, while the boost pressure is released via the pressure release valve, according to the present invention. The throttling on the input side of the compressor reduces the air mass flow which the compressor has to compress, so that the work saved thereby may also advantageously be used to increase the speed of the compressor wheel. This means that, by a throttling on the input side, the compressor or an exhaust gas turbocharger that includes the compressor is operated at greater efficiency, whereby advantageously a subsequent buildup of the boost pressure is also able to be achieved more rapidly, even after the end of a load interruption.

If the compressor is a component of an exhaust gas turbocharger, a separate second turbine may also advantageously be provided in rotary connection with the remaining running gear of the exhaust gas turbocharger, which is used especially so as to be driven by the air released via the pressure release valve according to the present invention.

Because of the rapid response, the compressor according to the present invention is particularly suitable for supplying an internal combustion engine of a motor vehicle, but it may also be used in connection with other uses of compressed air.

Further advantages, features and details result from the following description, in which different exemplary embodiments of the present invention are shown with reference to the drawings. In this context, the features mentioned in the claims and the specification may be essential to the present invention either alone or in any combination.

DETAILED DESCRIPTION

Figure 1:
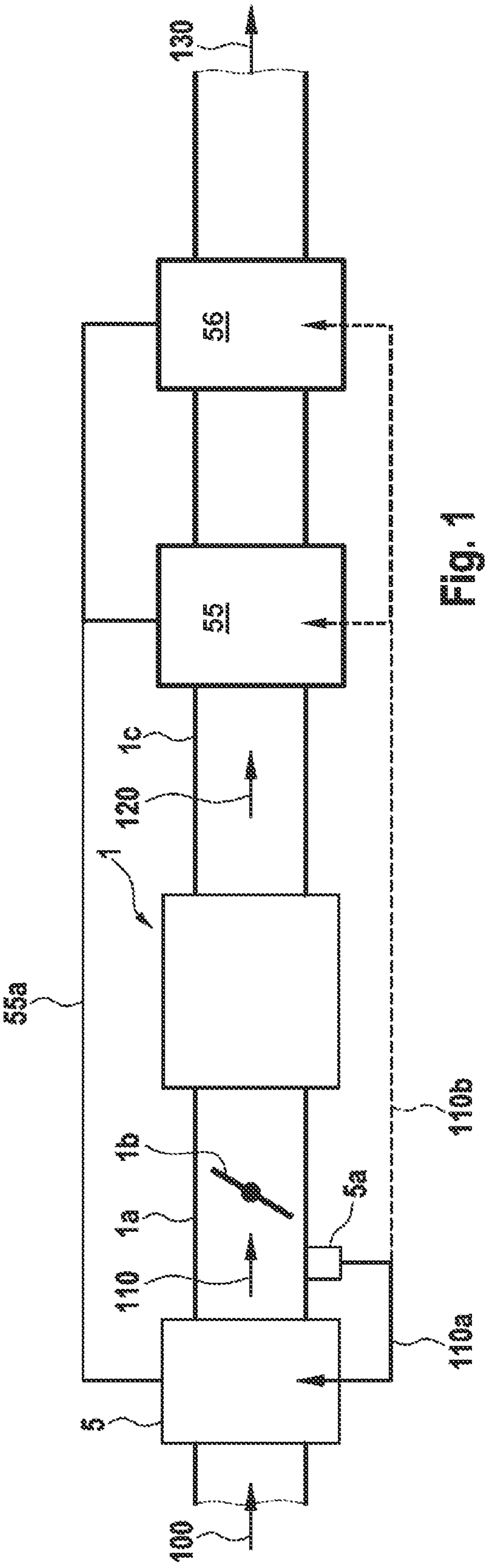
FIG. 1 shows a schematic representation of a compressor according to the present invention, together with an internal combustion engine that is to be supplied.

FIG. 1 shows a simplified block diagram of an internal combustion engine 1 which is used, for example, to drive a motor vehicle, that is not shown. Internal combustion engine 1 may be developed as an Otto engine or a diesel engine, and includes an engine block, not identified in greater detail, having one or more cylinders to which air is supplied via intake manifold 1*a*. In intake manifold 1*a* there is a throttle valve 1*b* which controls an air mass flow supplied to the cylinders, in a known manner.

Combustion exhaust gases of internal combustion engine 1 are discharged through exhaust gas pipe 1*c* that is also shown in FIG. 1. The air supplied to internal combustion engine 1 is indicated in FIG. 1 by arrow 110, and the exhaust gases generated by internal combustion engine 1 are indicated in FIG. 1 by arrow 120.

Internal combustion engine 1, according to the present invention, has a compressor 5 that is assigned to it at its input side and that supplies it with air 110 that is compressed to a boost pressure. For this purpose, compressor 5 has a compressor wheel (not shown), which is used for the compression of air 100 supplied to it at the input side.

Compressor 5 may be driven, for instance, by its own drive (not shown), which in particular may be designed to be electrical. However, compressor 5 is preferably a component of an exhaust gas turbocharger, and driven by a turbine 55, which is in rotary connection with the compressor wheel of compressor 5, for instance, by a common shaft 55*a*.

Turbine 55 of the exhaust gas turbocharger is driven, by exhaust gases 120 generated by internal combustion engine 1, in a known manner. Thereafter, the exhaust gases leave a turbine chamber (not shown) that includes turbine 55, as shown by arrow 130.

Pressure release valve 5*a* is provided to be able to reduce rapidly the boost pressure which air 110 has, compressed by compressor 5, in intake manifold la. A quick reduction of the boost pressure is required, for instance, when a negative abrupt change in load appears in internal combustion engine 1, and throttle valve 1*b* is closed, in order to reduce the torque output by internal combustion engine 1.

Air 110*a*, 110*b* released via pressure release valve 5*a*, according to the present invention, is used for driving the compressor wheel of compressor 5.

In a first, very advantageous variant of the present invention, it may be provided, for example, that released air 110*a* is conveyed directly onto the compressor wheel of compressor 5, so that the compressor wheel is driven in a comparable manner to a cold-air turbine. In the process, the air jet of released air 110*a*, based on the pressure difference between the boost pressure in intake manifold 1*a* and a pressure prevailing at the input side of the compressor wheel, transfers a pulse to the compressor wheel which further accelerates the compressor wheel, or at least prevents the falling off of the compressor wheel's speed. In this way, the speed of the compressor wheel does not fall substantially below a nominal speed, even in response to a reduction in the boost pressure in intake manifold 1*a*, so that a renewed buildup of the boost pressure in intake manifold 1*a* is very rapidly possible, according to the present invention. Because of this, the response of internal combustion engine 1 that is supplied with compressed air 110 by compressor 5 is improved, particularly in dynamic operating situations, such as rapidly successive load changes.

According to yet another advantageous specific embodiment of the operating method according to the present invention, released air 110*a* may also be conveyed tangentially onto guide blades of compressor 5.

An alternative variant of the operating method according to the present invention provides that released air 110*b* is not conveyed directly onto the compressor wheel of compressor 5, but rather onto turbine 55, which is in rotary connection with the compressor wheel, which is the case in the usual exhaust gas turbochargers, for example.

Analogously to the first variant of the invention described above, which is also able to be used in the case of separately provided compressors 5, that is, without an assigned turbine 55, in the second variant of the operating method according to the present invention, the released compressed air 110*b* is advantageously used for preventing a dropoff in the speed of the compressor wheel. Released air 110*b* is preferably conveyed directly onto the guide blades of turbine 55, which otherwise have only exhaust gas 120 applied to them. Because of the conveying of released air 110*b*, according to the present invention, the speed of turbine 55 and the compressor wheel of compressor 5 increases, and a further dropoff is prevented, especially in response to a load change that goes along with the reduction in the boost pressure.

A disproportional increase in the gas pressure at the input to turbine 55, that is possibly generated by the method according to the present invention, may be avoided, for instance, by a specific, coordinated activation of a so-called waste gate (not shown), which makes possible, in a known manner, a pressure reduction from exhaust gas pipe 1*c* into regions of the exhaust gas tract situated at the output end of turbine 55. This ensures that, when the method according to the present invention is used, turbine 55 is also able to be always operated at an optimum operating point.

All in all, the principle according to the present invention makes possible accelerating the running gear of an exhaust gas turbocharger or a compressor wheel of compressor 5, at load changes or load interruptions at simultaneous boost pressure decrease, or at least keeping them at a higher speed level than usual methods, which makes possible a better response of compressor 5, and with that, of internal combustion engine 1.

It is also conceivable to combine the method variants described above.

In addition, an air mass flow 100 supplied to compressor 5 at its input side may advantageously be throttled by suitable throttling means (not shown). This ensures that the energy obtained from compressed, released air 110*a*, 110*b*, according to the present invention, for accelerating the compressor wheel, does not additionally have to be used for the compression of an unnecessarily big air mass flow 100 supplied on the input side, but is rather used only for increasing the speed of the compressor wheel.

As the throttling means, one may use, for instance, an iris diaphragm, a throttle valve and/or a throttle blade or a baffle plate, or the like. All in all, the throttling makes possible a shift in the operating point of compressor 5 in the direction towards higher efficiencies and also an increase in the volume flow of released, compressed air 110*a* to the compressor wheel. Because of operating at higher efficiencies, a faster boost pressure buildup is achieved after a prior load interruption. During travel operation of a motor vehicle including internal combustion engine 1, this becomes noticeable by a more rapid torque buildup and a clearly shorter response by the internal combustion engine.

According to one additional very advantageous variant of the present invention, released, compressed air 110*b* may be conveyed onto a separate turbine 56 which, analogously to exhaust gas turbine 55 of an exhaust gas turbocharger, is in rotary connection to shaft 55*a*, on which the compressor wheel of compressor 5 is also situated. The separate turbine 56 for applying released air 110*b*, that is under boost pressure, may especially advantageously be situated in its own turbine housing, and, in particular, does not have to be situated in the region of exhaust gas tract 1*c*, where comparatively high temperatures prevail.

Figure 2:
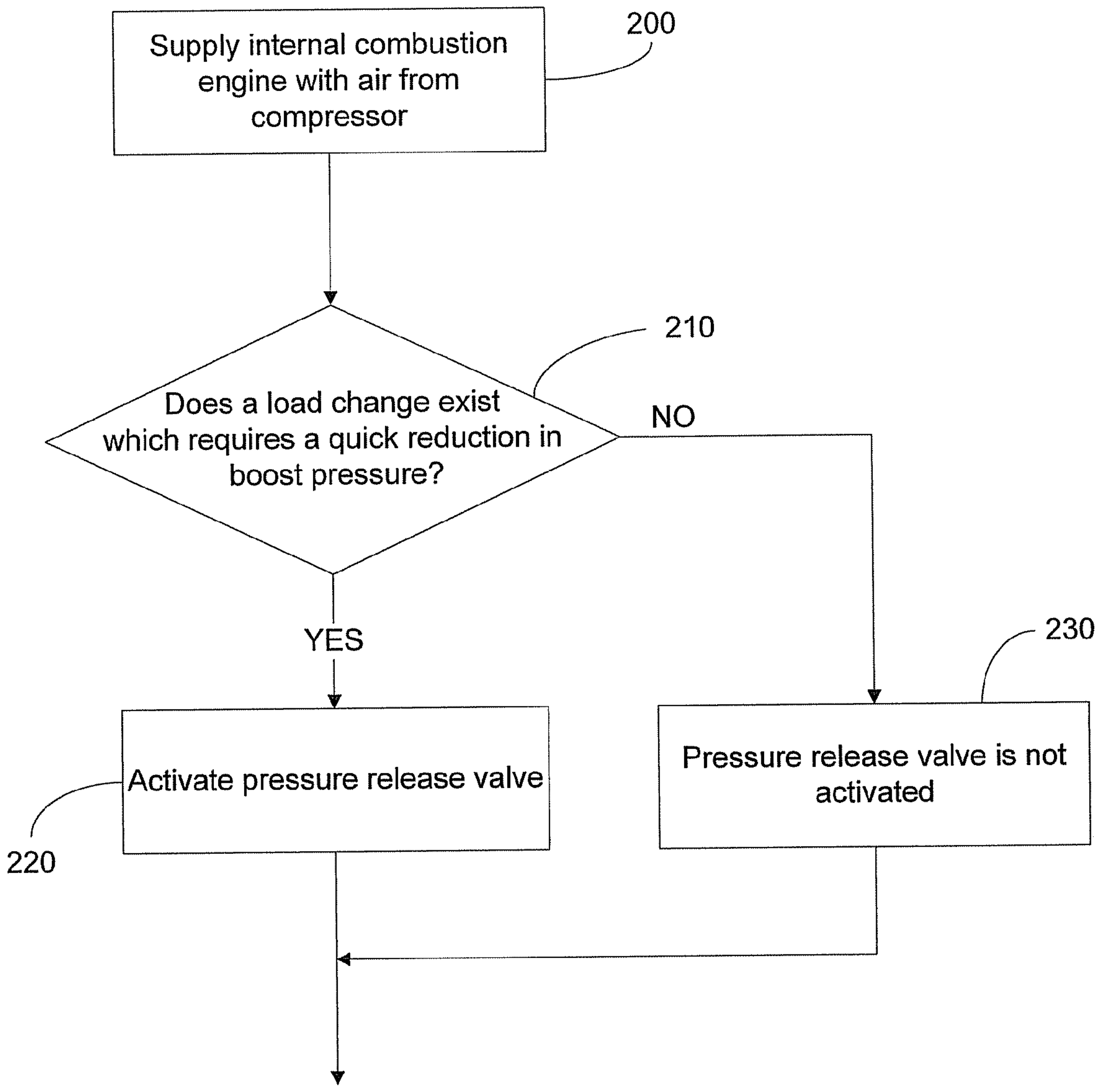
FIG. 2 shows a simplified flow chart of a specific embodiment of an operating method according to the present invention.

FIG. 2 schematically shows a simplified flow chart of the operating method according to the present invention. A first step 200 of the operating method, according to the present invention, in this case symbolizes a normal state of internal combustion engine 1, in which internal combustion engine 1 is supplied by compressor 5 with air 110 that is under boost pressure.

According to the present invention, it is checked in step 210 whether a load change of internal combustion engine 1 is present, in such a way that the boost pressure built up by compressor 5 in intake manifold 1*a* should be reduced as quickly as possible. If this is the case, the method according to the present invention branches to subsequent work step 220, in which pressure release valve 5*a* is activated according to the present invention, and the compressed air 110*a*, 110*b* hereby released, is used, in the manner described several times above, for driving either the compressor wheel of compressor 5 directly, or turbine 55 of exhaust gas turbocharger or the like.

If no load change is taking place, or no decrease in boost pressure is required, pressure release valve 5*a* is not activated in step 230.

What is claimed is:

1. A method for operating a compressor having a first turbine in rotary connection with a compressor wheel and a second turbine in rotary connection to the compressor wheel and situated in a separate turbine housing from a turbine housing of the first turbine, the method comprising:
- supplying an internal combustion engine, assigned to an output end of the compressor, with air compressed to a boost pressure, in which the boost pressure is reducible by releasing the compressed air at least partially via a pressure release valve;
- releasing air via the pressure release valve onto the second turbine; and
- using the released air for driving the compressor wheel of the compressor.

2. The method as recited in claim 1, wherein the released air is conveyed directly onto the compressor wheel of the compressor.

3. The method as recited in claim 1, wherein the released air is conveyed tangentially onto guide blades of the compressor.

4. The method as recited in claim 1, wherein the compressor is throttled at its input side.

5. The method as recited in claim 1, wherein the released air is conveyed directly onto the compressor wheel of the compressor, and wherein the compressor is throttled at its input side.

6. The method as recited in claim 1, wherein the released air is conveyed tangentially onto guide blades of the compressor, and wherein the compressor is throttled at its input side.

7. A compressor for supplying an internal combustion engine, assigned to an output end of the compressor, with air compressed to a boost pressure, in which a pressure release valve is situated in order to reduce the boost pressure by at least a partial release of the compressed air, comprising:
- a first turbine in rotary connection with a compressor wheel; and
- a second turbine in rotary connection to the compressor wheel and situated in a separate turbine housing from a turbine housing of the first turbine,
- a compressor arrangement conveying the released air via the pressure release valve onto the second turbine so as to drive the compressor wheel.

8. The compressor as recited in claim 7, further comprising:
- a throttling arrangement at an input side of the compressor arrangement for limiting an air mass flow supplied at the input side.

9. The compressor as recited in claim 7, wherein the released air is conveyed directly onto the compressor wheel of the compressor, and wherein the compressor is throttled at its input side.

10. The compressor as recited in claim 7, wherein the released air is conveyed tangentially onto guide blades of the compressor, and wherein the compressor is throttled at its input side.

11. An internal combustion engine, comprising:
- a compressor configured to supply the internal combustion engine, assigned to an output end of the compressor, with air compressed to a boost pressure, in which a pressure release valve is situated in order to reduce the boost pressure by at least a partial release of the compressed air;
- wherein the compressor includes a first turbine in rotary connection with a compressor wheel, and a second turbine in rotary connection to the compressor wheel and situated in a separate turbine housing from a turbine housing of the first turbine, and
- wherein the air released via the pressure release valve is conveyed onto the second turbine so as to drive the compressor wheel.

12. The internal combustion engine as recited in claim 11, wherein the compressor includes a throttling arrangement at an input side of the compressor arrangement for limiting an air mass flow supplied at the input side.

13. The internal combustion engine as recited in claim 11, wherein the released air is conveyed directly onto the compressor wheel of the compressor, and wherein the compressor is throttled at its input side.

14. The internal combustion engine as recited in claim 11, wherein the released air is conveyed tangentially onto guide blades of the compressor, and wherein the compressor is throttled at its input side.

* * * * *